United States Patent
Kuschel et al.

(10) Patent No.: US 6,530,526 B1
(45) Date of Patent: Mar. 11, 2003

(54) DEVICE FOR TRANSMITTING INFORMATION BY MEANS OF ACOUSTIC SIGNALS

(75) Inventors: Dietmar Kuschel, Dielmannstrasse 54, D-63069 Offenbach (DE); Knud Kudnig, Trier (DE)

(73) Assignee: Dietmar Kuschel, Offenbach (DE)

( * ) Notice: Subject to any disclaimer, the term of this patent is extended or adjusted under 35 U.S.C. 154(b) by 0 days.

(21) Appl. No.: 09/582,279

(22) PCT Filed: Dec. 22, 1998

(86) PCT No.: PCT/DE98/03773

§ 371 (c)(1),
(2), (4) Date: Jun. 23, 2000

(87) PCT Pub. No.: WO99/34324

PCT Pub. Date: Jul. 8, 1999

(30) Foreign Application Priority Data

Dec. 23, 1997 (DE) ..................................... 297 22 679 U
May 22, 1998 (DE) .......................................... 198 22 875

(51) Int. Cl.⁷ ................................................. G06K 21/00
(52) U.S. Cl. ..................... 235/489; 235/235; 235/456; 235/441; 235/384; 235/380
(58) Field of Search ................................ 235/489, 456, 235/441, 384, 380

(56) References Cited

U.S. PATENT DOCUMENTS

| | | | | |
|---|---|---|---|---|
| 3,800,283 A | * | 3/1974 | Gropper | 379/91.01 |
| 4,304,992 A | | 12/1981 | Kobayashi et al. | 235/449 |
| 4,605,846 A | * | 8/1986 | Duret et al. | 235/456 |
| 4,717,817 A | * | 1/1988 | Grassl et al. | 235/441 |
| 4,845,740 A | * | 7/1989 | Tokuyama et al. | 235/380 |
| 4,880,963 A | * | 11/1989 | Yamashita | 235/384 |
| 5,550,359 A | * | 8/1996 | Bennett | 235/380 |

FOREIGN PATENT DOCUMENTS

| | | |
|---|---|---|
| DE | 4435170 | 12/1996 |
| DE | 29807972 | 10/1998 |
| JP | 358225470 A | * 12/1983 |

* cited by examiner

Primary Examiner—Karl D. Frech
Assistant Examiner—Allyson Sanders
(74) Attorney, Agent, or Firm—Milde & Hoffberg, LLP

(57) ABSTRACT

In a device for generating acoustic signals, a mechanical profile which contains information in a coded form is arranged on the surface of a plastic card, can be lead over an edge for generating sounds which contain information, and has at least two adjacent tracks. The plastic card can be inserted into a guiding part, for example a card slide, provided with at least one scanning cam of which one edge rattles on the profile when the profile is drawn past it.

19 Claims, 2 Drawing Sheets

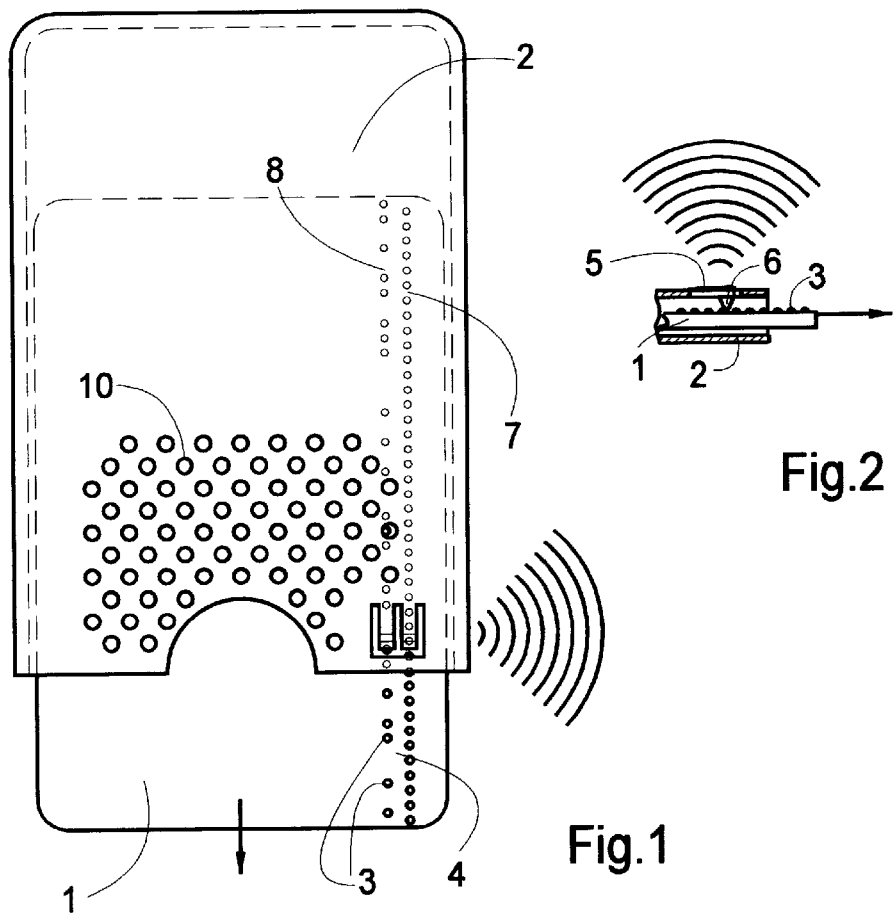
Fig.2
Fig.1
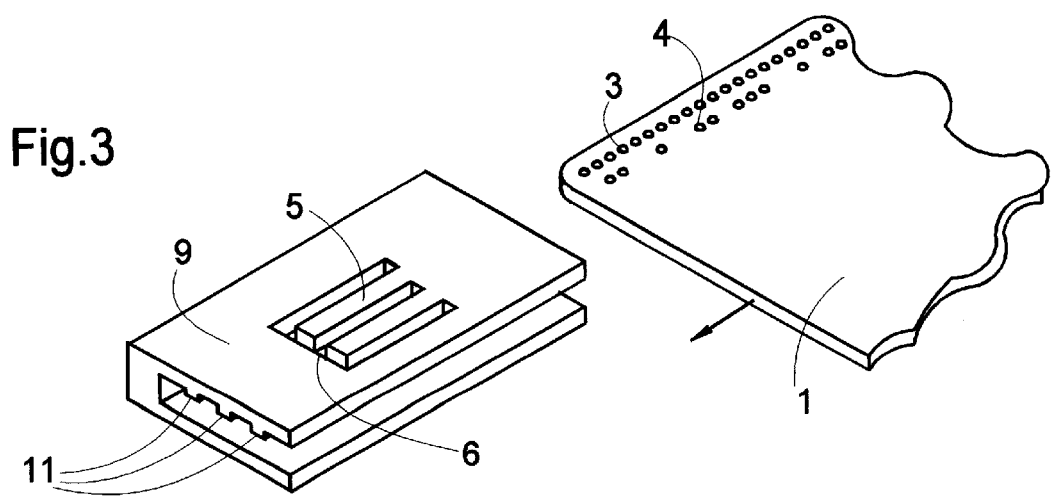
Fig.3

DEVICE FOR TRANSMITTING INFORMATION BY MEANS OF ACOUSTIC SIGNALS

BACKGROUND OF THE INVENTION

The invention concerns a device used to create acoustic signals whereby the surface of a plastic card has a mechanical profile that contains the information to be sent in coded form and which may be passed over a ridge to create sounds which contain the information.

Credit cards and customer cards have earned wide acceptance in that companies use card reader systems for customer service to an increasing degree. Telephone centers are often established for this purpose at which customer queries and services may be handled telephonically. For this, it is necessary that the customer identify himself before the transaction by means of his account number and a secret number (PIN code), and the transaction is often handled by electronic data processing. Account numbers are generally up to 16 digits long, and PIN codes are generally four digits. During entry of this data, transmission errors often occur because of improper reading by the customer, or because of listening errors at the telephone service center.

A complicating factor is that some customers read their account number and PIN in blocks of digits of varying length. Even if no transmission error occurs, the process is relatively time-intensive, resulting in increased costs in telephone charges either to the customer or the telephone service center. Since these telephone service centers cover an extensive geographical area, most of these calls are long-distance.

Efforts to automate these processes using speech dialog systems have not produced a reduction in the error rate, and repeated queries may be required before the customer correctly enters his account number and correct PIN. Errors at the telephone service center may be avoided by number entry using the telephone keypad in telephone networks employing multi-frequency (touch-tone) dialing. However, this does not eliminate the possibility of errors and the time consumed when the customer enters his data manually.

To solve this problem, the German Patent No. 44 35 170 disclosed a device of this type. However, it has turned out disadvantageously that data transmission quality using such a device depends on, among other things, whether the plastic card is passed completely and uniformly over the ridge. Further, the pressure on the ridge is not constant, which may also lead to errors.

SUMMARY OF THE INVENTION

This invention fulfills the task of producing a device described in the basic description that is simple and effective.

This task is solved in that the mechanical profile features at least two adjacent tracks parallel to the edge of the card, that at least one of the first tracks contains the data and at least one of other tracks (synchronization track) contains a repeating pattern for its entire length. Thus, it is possible to form a mechanical profile on the card which is read by varying adjacent or subsequently-positioned reader cams, each of which features its own internal resonant frequency, and which features both a data track and a synchronization track.

In the resulting sound produced, the regular pattern of the synchronization track creates structures that may be recognized and evaluated using tone analysis. Using these structures, the remaining signals of the sound may be assigned to a unique position on the mechanical profile of the plastic card, and thereby to a unique position of the encoded information. The user of this device is no longer required to swipe the plastic card over the ridge at a constant speed or with a constant pressure.

A preliminary embodiment of the invention uses a profile of raised bumps, which offers the advantage that the bumps may be easily produced by pressure molding.

In order to be able to store the maximum amount of information within the length of a typical telephone card, and to obtain uniquely-arranged signals, a further embodiment of the invention may include the fact that the bumps of each track are displaced with respect to the points of a neighboring track along the reading direction. This would allow more bumps on the card per length unit for data storage and synchronization since the bases of the bumps do not intersect with one another. Only the tips of the bumps are used to produce the sound. After the reader cam passes over the tip of a bump or reaches a depression in the mechanical profile, it strikes the card surface and creates an acoustic impulse.

Other configurations of the invention might feature the fact that the profile is pressed into the surface of the card using depressions such as cross-grooves or holes in the card, or in a plastic strip or tape featuring the mechanical profile mounted on the card. Such elements prepared in advance could be glued or welded to the card. In this manner, existing cards could be retrofitted with a mechanical profile in accordance with the invention.

Plastic cards may be impressed so that the mechanical profile contains 56 bits of encoded information, which has proved advantageous in the existing transmission of identification information.

In order to assure constant pressure and thereby predefined impulse strength of the resulting sound, a guide [is provided] through which the plastic card may be swiped, and which features at least one reader cam that at least partially surrounds the card and slides over the profile to produce the sound containing the data when the card is swiped. For this, it is advantageous for at least one reader cam to be attached to a flexible prong that presses the reader cam against the profile.

Reader cams may be so arranged that they slide over the bumps or depressions in the profile when the card is swiped. The reader cams strike the surface of the card because of the tension, creating an acoustic impulse, after passing over a bump or depression in the profile because of the pressure against the plastic card. The resulting sound contains the information encoded in the mechanical profile.

In order to better read closely-placed bumps, further embodiments of the invention might contain the feature that at least one reader cam contain laterally-displaced striking elements used to create the acoustic impulse by striking the surface of the card, or that at least one reader cam which reads the raised bumps features a convex reading ridge which reads only the tips of the bumps because of its convexity, and which strikes the card using the lateral parts which are lower to create the acoustic impulse when the reader cam passes over the tips of the bumps.

The flexible prongs may be secured from several sides, which makes them very stiff, contributing to a fairly high internal resonant frequency. A future embodiment of the invention might contain at least one flexible prong that is attached on one side to the insertion guide, while the other side is free to move. This would allow the reader cams to move freely. The flexible prongs can be parallel or perpendicular to the direction of card movement.

It is necessary that for proper quality of the sound produced, the profile features at least two tracks, and that each track has its own reader cam which is so located in the guide that it reads its own track, and creates its own sound, when the plastic card is slid through. Thus, the sound would be clearer and more easily analyzed since each cam is assigned to only one track, and the cams would not affect each other.

An alternative to the above-mentioned displacement of the profile bumps would be for another embodiment of the invention to have the reader cams offset from each other in the direction of the swipe in order to create an advantageous time offset of the sound impulses. The offset of the bumps of each track to the other, as described above, and the offset of the reader cams, could be combined to provide adjustment to the sound produced, depending on the application.

In order to provide the reader cam that fits a profile embodied by the invention with easy adaptability to any guide, a further embodiment offers the feature that at least one reader cam be attached to a separate component which can be inserted into the opening in the guide provided for it. Thus, production of the guide might be simplified since the reader cams would not have to be included. Further, various reader cams could be used to read various types of cards.

A useful shape of a case used with a plastic card designed according to the invention is characterized by the fact that the guide would feature a gate-like recess with a moveable slide which carries at least one reader cam and which could be slid over the mechanical profile of the plastic card to create the sounds. Thus, the sounds could be created without having to remove the card from the case.

A further embodiment could allow easier analysis of the sounds by having flexible prongs of varying lengths, so that they have different internal resonant frequencies.

In order to read the bumps of the mechanical profile, at least one reader cam may be prism-shaped and features a triangular cross-section, whereby one of the edges is pointed toward the profile to be read. In order to read trough-shaped depressions, at least one of the reader cams may alternatively be sharply pointed, particularly spherical or pyramid-shaped, whereby the tip is pointed toward the profile to be read. The edge or tip of the reader cam pointed toward the card profile will slide over the raised bumps or depressions of the profile.

In order to provide straight and aligned insertion of the plastic card into the guide, a future embodiment of the invention features a guide with internal guide strips that at least partially surround the mechanical profile in order to guide the card. Further, the guide strips maintain a distinct separation between the mechanical profile and the inner side of the guide. This prevents the card from jamming within the guide.

Alternatively, it is possible that the guide is a U-shaped guide rail that is designed to surround the sides of the plastic card and, for example, is attached to the telephone or cellular phone receiver.

An embodiment of the invention might also include the fact that the guide is mounted on the telephone receiver.

An early embodiment of the invention contains the feature that the insertion guide is a case which features at least one reader cam near the insertion opening by means of which the sounds are generated when the plastic card is extracted from the case. The case can be pressed against the microphone of the telephone receiver while the plastic card is extracted from the case in order to transmit the signals. In this manner, the signal is conducted mechanically via the housing of the telephone receiver to the microphone. Thus, external sounds would have only a minor effect on signal transmission.

The case can be produced in two parts whereby the upper and lower halves are separate, and are attached at projecting points, so that a flat, hollow cavity containing the card is formed. The card case can also be formed as one piece by injection molding.

For the situation in which the case is held against the telephone microphone during the conversation, it would be advantageous for the case to contain sound openings through which one may speak. The case and the reader cams can be made of metal and/or plastic.

In order to assure proper function of the device even when the user inserts the card improperly into the case, a further embodiment of the invention includes the feature that the case contain at least one additional set of reader cams placed on the diagonally opposite side of the card case to the reader cam.

A further embodiment of the invention could feature a case with a slip-proof surface on at least one side. The card case could thereby be more easily held against the telephone microphone without sliding away when the card is extracted.

A future embodiment of the invention might feature exchangeable digit plates with printed digits that may be clipped onto the case as a memory aid, for example, with PIN numbers, or the case might feature settable digital scales. The user sets the digits of his PIN on the case and can read them as required.

For a full understanding of the present invention, reference should now be made to the following detailed description of the preferred embodiments of the invention as illustrated in the accompanying drawings.

BRIEF DESCRIPTION OF THE DRAWINGS

FIG. 1 is a plastic card in a case during extraction,

FIG. 2 is the reading mechanism of this case in cross-section,

FIG. 3 is a guide rail according to the invention with a reading mechanism,

FIG. 5 is a hollow reader cam in two perspectives (lateral and overhead view) with the mechanical profile passing by.

DESCRIPTION OF THE PREFERRED EMBODIMENTS

Figure 4:
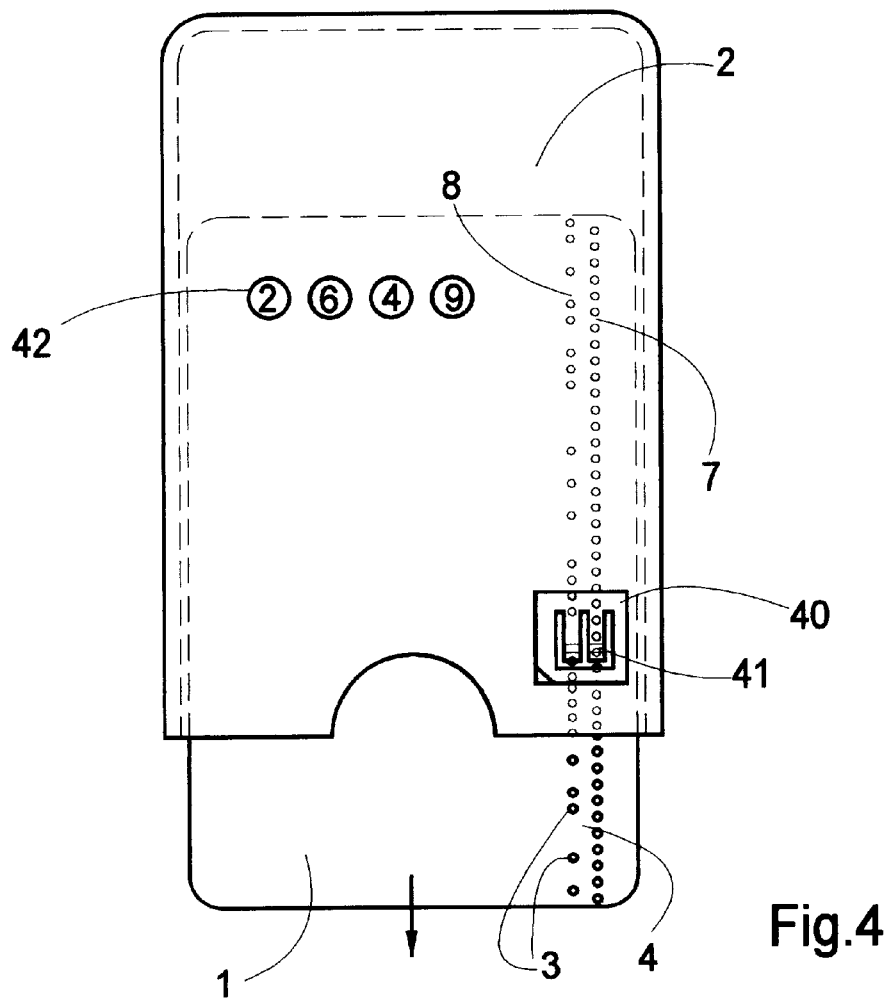
FIG. 4 is a plastic card in its case with digit clips and exchangeable reader cams.

Identical parts feature identical reference numbers in all drawings.

FIG. 1 shows a plastic card 1, for example a telephone card or credit card, as it is being extracted from a card case 2. The raised bumps 3 of the profile 4 slide past two shaped reader cams 6 mounted on flexible prongs 5, creating a sound that contains the information encoded in the profile 4. The case 2 is held against the telephone receiver during this process so that the sound is transmitted over the telephone line to the receiving station where it may be analyzed. In the situation where the card case is held over the receiver microphone after the card 1 is extracted, the case features sound holes 10 through which a conversation is possible.

FIG. 2 shows the reader mechanism with the reader cam 6 in cross-section. Each bump 3 of the card profile 4 raises the reader cam 6 as it passes, and allows it to fall back after passing, so that it strikes the card surface or the front of the next bump 3, creating a sound impulse. In this manner, a sound containing a series of such impulses is created that is dependent on the extraction speed.

The information contained in the profile 4 pressed into the card may be reconstructed based on the temporal arrangement of the impulses in the sound. A regular impulse series is created by the synchronization track 7 that is imposed over the sound from the information track 8. Using this impulse series, the impulses from the data track 8 may be uniquely assigned a position in the card profile 4, even if the speed is not constant.

Thus, even inexperienced users can easily use this mechanism. It is even possible to add a third track whose bumps 3 contain an inverted version of the information track 8.

Finally, FIG. 3 shows yet another reading mechanism. The reader cams 6 are connected to a guide rail 9 which, for example, can be mounted on any telephone, portable telephone, or in telephone booths. The function is the same as with the card case 2.

In order to assure straight swiping of the card 1, guide rails 11 are arranged on the inner side of the guide 9, which partially surround the bump tracks 4. In this manner, it is ensured that the bump tracks 4 are read completely. A card case based on the invention can be equipped with similar guides for the same purpose.

FIG. 4 shows a card case 2 equipped with an exchangeable clip 40. The clip 40 contains the reader cams 41. Further, exchangeable digit carriers 42 can be mounted on the card case 2 to record the PIN.

Figure 5:
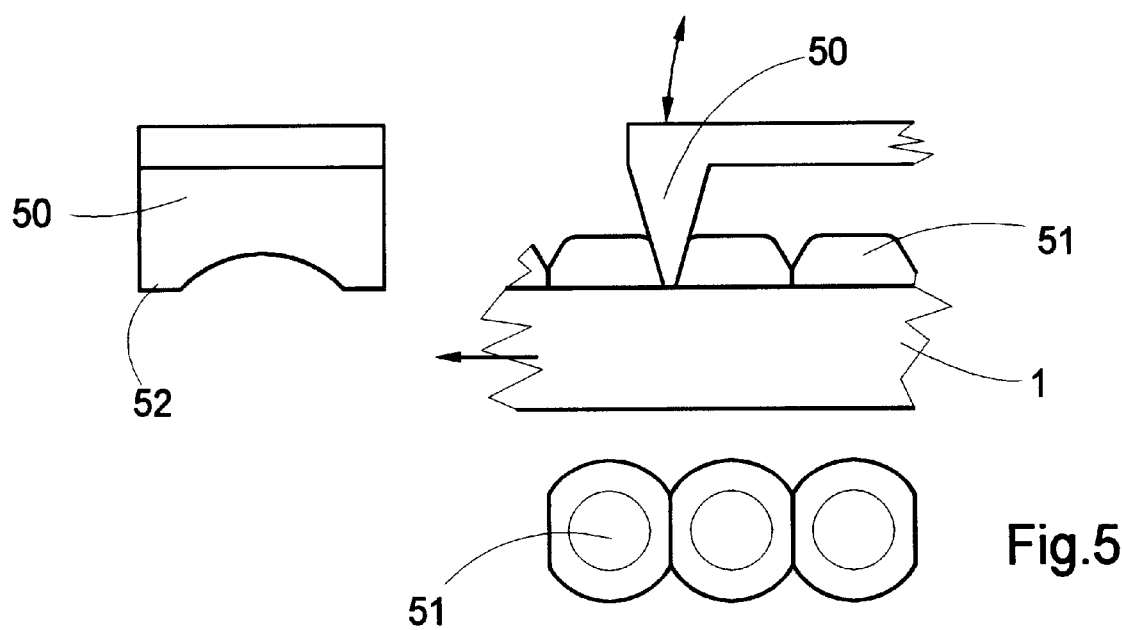

In order to read bumps 51 positioned closely together, it is intended that the reader cams 50 are convex in the center, as shown in FIG. 5. This would allow the lateral parts 52 of the reader cams to strike the card 1 better.

There has thus been shown and described a novel device for transmitting information by means of acoustic signals which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A device for creating acoustic signals wherein a mechanical profile containing data in encoded form is formed on a surface of a plastic card, and wherein the plastic card is used to create acoustic signals containing this data when the mechanical profile is passed over an edge, an improvement wherein the mechanical profile includes at least two adjacent tracks, wherein at least one of the tracks includes a regular, repeating pattern, and wherein at least one additional track contains the data.

2. Device as set forth in claim 1, wherein the profile is formed using raised bumps.

3. Device as set forth in claim 2, wherein the bumps of each track are displaced in a direction of movement with respect to the bumps of the adjacent tracks.

4. Device as set forth in claim 1, wherein the profile is formed by depressions pressed into the card surface.

5. Device as set forth in claim 1, wherein the profile is formed by holes punched in the card.

6. A device used to create acoustic signals wherein a mechanical profile containing encoded data is formed on a surface of a plastic card and which may be slid over an edge to create acoustic signals containing the data, an improvement comprising a guide into which the plastic card may be inserted, and which includes at least one reader cam that creates the sounds when sliding over the profile when the card is swiped.

7. Device as set forth in claim 6, wherein the guide is a case for the plastic card that includes at least one reader cam in the area of the insertion opening so that the sounds are created when the plastic card is extracted from the case.

8. Device as set forth in claim 6, wherein the card case includes an additional set of reader cams diagonally opposed across the insertion opening from at least one of the reader cams.

9. Device as set forth in claim 6, wherein the guide is a U-shaped rail.

10. Device as set forth in claim 9, wherein the guide is attached to a telephone receiver or hand-held telephone.

11. Device as set forth in claim 6, wherein the guide is a case for the plastic card, wherein the case includes a gate-shaped opening in which a moveable slide having at least one reader cam may be slid over the mechanical profile to create the sound.

12. Device as set forth in claim 6, wherein at least one reader cam is attached to a flexible prong that presses the reader cam against the profile.

13. Device as set forth in claim 6, wherein several flexible prongs are of varying lengths so that they include varying internal resonant frequencies.

14. Device as set forth in claim 6, wherein the guide includes several adjacent reader cams used to read the tracks of the mechanical profile.

15. Device as set forth in claim 6, wherein at least one of the reader cams is prism-shaped and includes a basically triangular cross-section, and wherein one of the edges thereof is directed toward the profile to be read.

16. Device as set forth in claim 6, wherein at least one of the reader cams is pointed, particularly spherical or pyramid-shaped, and wherein a tip of said at least one reader cam is directed toward the profile to be read.

17. Device as set forth in claim 6, wherein at least one reader cam used to read raised bumps includes a reading edge raised in the center which reads only tips of the bumps because of its convexity, and which strikes the surface of the card with its lower parts after the reader passes over the tips of the bumps.

18. Device as set forth in claim 6, wherein the reader cams are arranged with an offset in the direction of the card swipe.

19. Device as set forth in claim 6, wherein the guide includes interior guide strips for the plastic card that at least partially surround the mechanical profile.

\* \* \* \* \*